United States Patent
Pengoria et al.

(10) Patent No.: US 9,538,550 B2
(45) Date of Patent: Jan. 3, 2017

(54) COOPERATIVE UPLINK RECEPTION SUITABLE FOR NON-IDEAL BACKHAUL

(71) Applicant: Nokia Solutions and Networks Oy, Espoo (FI)

(72) Inventors: Deepak Pengoria, Agra (IN); Shirish Nagaraj, Hoffman Estates, IL (US); Rajeev Agrawal, Glenview, IL (US)

(73) Assignee: Nokia Solutions and Networks Oy, Espoo (FI)

( * ) Notice: Subject to any disclaimer, the term of this patent is extended or adjusted under 35 U.S.C. 154(b) by 195 days.

(21) Appl. No.: 14/505,733

(22) Filed: Oct. 3, 2014

(65) Prior Publication Data

US 2016/0100423 A1    Apr. 7, 2016

(51) Int. Cl.
| | |
|---|---|
| H04B 7/02 | (2006.01) |
| H04W 72/12 | (2009.01) |
| H04L 1/00 | (2006.01) |
| H04L 1/18 | (2006.01) |

(52) U.S. Cl.
CPC ......... *H04W 72/1294* (2013.01); *H04B 7/024* (2013.01); *H04L 1/0077* (2013.01); *H04L 1/1812* (2013.01); *H04L 1/1854* (2013.01)

(58) Field of Classification Search
CPC ...... H04B 7/024; H04L 1/0077; H04L 1/1812; H04L 1/1854; H04W 72/1294
USPC ........................................................ 370/329
See application file for complete search history.

(56) References Cited

U.S. PATENT DOCUMENTS

| | | | |
|---|---|---|---|
| 2012/0100878 A1* | 4/2012 | Quek ................... | H04W 48/16 455/507 |
| 2012/0120927 A1* | 5/2012 | Bucknell ............... | H04B 7/022 370/336 |
| 2012/0176887 A1 | 7/2012 | Mcbeath et al. ............. | 370/216 |
| 2013/0121186 A1 | 5/2013 | Vajapeyam et al. | |

(Continued)

FOREIGN PATENT DOCUMENTS

| | | |
|---|---|---|
| EP | 2320592 A1 | 5/2011 |
| WO | WO-2012/068421 A1 | 5/2012 |
| WO | WO-2014/109548 A1 | 7/2014 |

OTHER PUBLICATIONS

3GPP TSG RAN WG2 Meeting #65bis, R2-092196, "Impact of UL CoMP to HARQ operations", Seoul, Korea, Mar. 23-27, 2009, 2 pages.

(Continued)

*Primary Examiner* — Mohammad Anwar
*Assistant Examiner* — Kokou R Detse
(74) *Attorney, Agent, or Firm* — Harrington & Smith

(57) ABSTRACT

A first cell determines that UE(s) should have HARQ cycle(s) skipped, where each of the UE(s) is to take part in a CoMP transmission. Skipping is to be performed to enable the first cell to receive information from second cell(s) over backhaul link(s) for the HARQ transmission(s). A first HARQ cycle is scheduled and participated in for the UE(s) in order to receive a transmission at the first cell from the UE(s). The HARQ cycle(s) is/are skipped for the UE(s) by sending, prior to decoding information from the uplink CoMP transmissions, an acknowledgement to the UE(s) and not scheduling the UE(s) for a PDCCH grant for the HARQ cycle(s). The skipping depends on one or more of: a backhaul latency, a load in the first cell, a type of UE, or a request to the second cell(s). Apparatus and program products are also disclosed.

19 Claims, 12 Drawing Sheets

(56) References Cited

U.S. PATENT DOCUMENTS

2014/0185496 A1* 7/2014 Wolf ............... H04W 92/20
                                              370/294
2014/0192740 A1  7/2014 Ekpenyong et al. ......... 370/329

OTHER PUBLICATIONS

"Setup of CoMP cooperation areas", Nokia Siemens Networks, 3GPP TSG-RAN WG1 Meeting #56, R1-090725, Feb. 2009, 4 pgs.
"3$^{rd}$ Generation Partnership Project; Technical Specification Group Radio Access Network; Evolved Universal Terrestrial Radio Access (E-UTRA); Medium Access Control (MAC) protocol specification (Release 10)", 3GPP TS 36.321 V10.0.0, Dec. 2010, 53 pgs.
"3$^{rd}$ Generation Partnership Project; Technical Specification Group Radio Access Network; Evolved Universal Terrestrial Radio Access (E-UTRA); Further advancements for E-UTRA physical layer aspects (Release 9)", 3GPP TR 36.814 V9.0.0, Mar. 2010, 107 pgs.
"Coordinated Multipoint: Concepts, Performance, and Field Trial Results", R. Irmer, et al., IEEE, Feb. 2011, pp. 102-111.
"Uplink CoMP under a Constrained Backhaul and Imperfect Channel Knowledge", P. Marsch, et al., IEEE, Feb. 2010, 27 pgs.
"On the Optimal Number of Cooperative Base Stations in Network MIMO", J. Hoydis, et al., CoRR, vol. abs/0912.4595, Dec. 2009, 5 pgs.
"The Value of Channel Prediction in CoMP Systems with Large Backhaul Latency", L. Su, et al., IEEE, 2012, 6 pgs.
"Networked MIMO with Clustered Linear Precoding", J. Zhang, et al., IEEE Tran. Wireless Commun., vol. 8, No. 4, pp. 1910-1921, Apr. 2009.
"A dynamic clustering approach in wireless networks with multi-cell cooperative processing", A. Papadogiannis, et al., IEEE 2008, pp. 4033-4037, May 2008.
"On the Evolution of Multi-Cell Scheduling in 3GPP LTE/LTE-A", Emmanouil Pateromichaelakis, et al., IEEE Communications Surveys & Tutorials, vol. 15, No. 2, pp. 701-717, 2013.
"Performance Evaluation of Intra-Site Coordinated Multi-Point Transmission with Inter-cell Phase Information in 3GPP LTE-A", Chen-Yin Liao, et al., Wireless Personal Multimedia Communications (WPMC), pp. 241-245, 2012.
"Multi-cell Distributed Interference Cancellation for Co-operative Pico-cell Clusters", Shirish Nagaraj et al., IEEE 2012, pp. 4193-4199.
"Antenna Selection for Uplink CoMP in Dense Small-cell Clusters", Khalid Zeineddine, et al., IEEE 2013, pp. 81-85.
Alcatel-Lucent Shanghai Bell et al., "Discussion on CoMP related RAN2 issues", TSG-RAN WG2#68; Nov. 9-13, Jeju, Korea; 3GPP Draft; No. 20091109, Nov. 3, 2011, XP050391330, 3 pages.
Yuan Gao et al., "System Level Performance of CoMP IR-HARQ over X2 Interface in 3GPP LTE-Advanced System", IEEE, 9th International Conference on Communications (COMM), Jun. 21, 2012, pp. 177-180, XP032220416, DOI: 10.1109/ICCOMM.2012. 6262535, Sections I, II.B, III.A, III.C.
Alcatel-Lucent Shanghai Bell et al., "Impact of UL CoMP to HARQ operations", 3GPP TSG RAN WG2 Meeting#66; San Francisco, US; May 4-8, 2009; 3GPP Draft; No. 20090427, Apr. 27, 2009, XP050340836, [retrieved on Apr. 27, 2009] Sections 1 and 2.

\* cited by examiner

| | | Geometric mean gain over IRC Receiver | | | | | |
|---|---|---|---|---|---|---|---|
| | | Intra-site co-operation | | | Inter-site co-operation | | |
| | | High Load | Medium Load | Low Load | High Load | Medium Load | Low Load |
| Ideal Backhaul | | 14% | 7% | 3% | 46% | 22% | 12% |
| 5 ms | Adaptive HARQ Skip | 8% | 0% | 0% | 29% | 10% | 1% |
| | Fixed HARQ Skip | -2% | -28% | -32% | 19% | -19% | -26% |
| 10 ms | Adaptive HARQ Skip | 8% | 0% | 0% | 26% | 9% | 1% |
| | Fixed HARQ Skip | -15% | -47% | -51% | -3% | -41% | -46% |

FIG. 9

| Geometric mean gain over IRC Receiver | | High Load | Medium Load | Low Load |
| --- | --- | --- | --- | --- |
| Ideal Backhaul | | 60% | 15% | 8% |
| 5 ms | Adaptive HARQ Skip | 36% | 2% | 1% |
| 5 ms | Fixed HARQ Skip | 34% | 0% | -3% |
| 10 ms | Adaptive HARQ Skip | 27% | 1% | 1% |
| 10 ms | Fixed HARQ Skip | 18% | -11% | -9% |

FIG. 10

| | Geometric mean gain over IRC Receiver | | | | | |
|---|---|---|---|---|---|---|
| | Intra-macro co-operation | | | Inter-small cells co-operation | | |
| | Macro UEs | Small-Cells UEs | All UEs | Macro UEs | Small-Cells UEs | All UEs |
| | High Load, 10 Mbps Offered Load | | | | | |
| Ideal Backhaul | 87% | 43% | 68% | 0% | 45% | 17% |
| 5ms Adaptive HARQ Skip | 73% | 39% | 62% | 0% | 40% | 14% |
| 10ms Adaptive HARQ Skip | 67% | 33% | 53% | 0% | 36% | 9% |

FIG. 12

COOPERATIVE UPLINK RECEPTION SUITABLE FOR NON-IDEAL BACKHAUL

TECHNICAL FIELD

This invention relates generally to backhaul in a wireless network and, more specifically, relates to exchanging signal samples among nodes in a wireless network with a non-ideal backhaul network.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined at the end of the specification but prior to the claims.

Some example embodiments herein relate to a problem of exchanging signal samples among nodes in a wireless network with a non-ideal backhaul network. This exchange of information is essential to enable cooperative uplink reception. This can happen in various deployment scenarios, such as in macro networks with an X2 interface used for inter-BS interconnect, a cluster of small cells in dense environment, or heterogeneous deployment with a distributed backhaul network.

The backhaul network is required to exchange signal samples from a "helper" cell to a "recipient" cell for cooperative uplink reception. That is, one user equipment's transmission is received by both the helper cell and the recipient cell. The recipient cell will perform analysis on information received by itself and by the helper cell. The exchange of information between helper and recipient cells is either by circuit-switched or packet-switched backhaul networks, depending on architecture and deployment. Generally, the backhaul network is considered without any delay in information exchange, but this is not true in a real scenario. If the delay is small, less than one ms, the information can be utilized by the recipient cell to decode user data. If the delay is larger, e.g., five or 10 ms, this becomes a bottleneck, as the scheduler in the recipient cell needs to wait to decode user data. In LTE, there is a fixed time on the delay for transmitting an ACK/NACK to the user, which may be violated if the information from the helper cell arrives with a larger delay.

Standard UE behavior is that if the UE receives an ACK, the UE does not retransmit a packet to abase station. However, if later the UE receives an UL grant for the same packet (e.g., as indicated by the same NDI bit), the UE will retransmit the packet. The primary purpose (one might assume) of specifying this behavior is to account for the case where the base station sent an ACK, but the UE interpreted the ACK as a NACK (and therefore sent no retransmission).

BRIEF SUMMARY

This section is meant to be example and is not meant to be limiting.

A method comprises the following: determining at a first cell that a one or more user equipment in the first cell should have at least one hybrid automatic repeat request cycle skipped, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions; scheduling and participating in a first hybrid automatic repeat request cycle for the one or more user equipment in order to receive a transmission at the first cell from the one or more user equipment; and skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle, wherein the skipping depends on at least one of: a backhaul latency, a load in the first cell, a type of user equipment, and a request to the one or more second cells.

An additional exemplary embodiment includes a computer program, comprising code for performing the method of the previous paragraph, when the computer program is run on a processor. The computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform the following: determining at a first cell that a one or more user equipment in the first cell should have at least one hybrid automatic repeat request cycle skipped, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions; scheduling and participating in a first hybrid automatic repeat request cycle for the one or more user equipment in order to receive a transmission at the first cell from the one or more user equipment; and skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle, wherein the skipping depends on at least one of: a backhaul latency, a load in the first cell, a type of user equipment, and a request to the one or more second cells.

Another exemplary embodiment is an apparatus comprising: means for determining at a first cell that a one or more user equipment in the first cell should have at least one hybrid automatic repeat request cycle skipped, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions; means for scheduling and participating in a first hybrid automatic repeat request cycle for the one or more user equipment in order to receive a transmission at the first cell from the one or more user equipment; and means for skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle, wherein the skipping depends on at least one of: a backhaul latency, a load in the first cell, a type of user equipment, and a request to the one or more second cells.

An exemplary computer program product includes a computer-readable storage medium bearing computer program code embodied therein for use with a computer. The computer program code, responsive to execution by the computer, causes the computer to perform at least: determining at a first cell that a one or more user equipment in the first cell should have at least one hybrid automatic repeat request cycle skipped, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions; scheduling and participating in a first hybrid automatic repeat request cycle for the one or more user equipment in order to receive a transmission at the first cell from the one or more user equipment; and skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle, wherein the skipping depends on at least one of: a backhaul latency, a load in the first cell, a type of user equipment, and a request to the one or more second cells.

BRIEF DESCRIPTION OF THE DRAWINGS

In the attached Drawing Figures, in accordance with certain example embodiments:

FIG. 9 shows Table 1, which presents performance evaluation of UL CoMP in macro deployment with/without ideal backhaul;

FIG. 10 shows Table 2, which presents performance evaluation of UL CoMP in an isolated small cells deployment with/without ideal backhaul;

FIG. 12 shows Table 3, which presents performance evaluation of UL CoMP in heterogeneous deployment with/without ideal backhaul.

DETAILED DESCRIPTION OF THE DRAWINGS

The example embodiments herein propose adaptive management approaches for helper cells to address backhaul delay, where no loss might be retained with uplink CoMP in low load conditions, and ideal backhaul performance may be achieved with higher loading conditions. Additional description of these proposals is presented after a system into which the example embodiments may be used is described.

Figure 1:
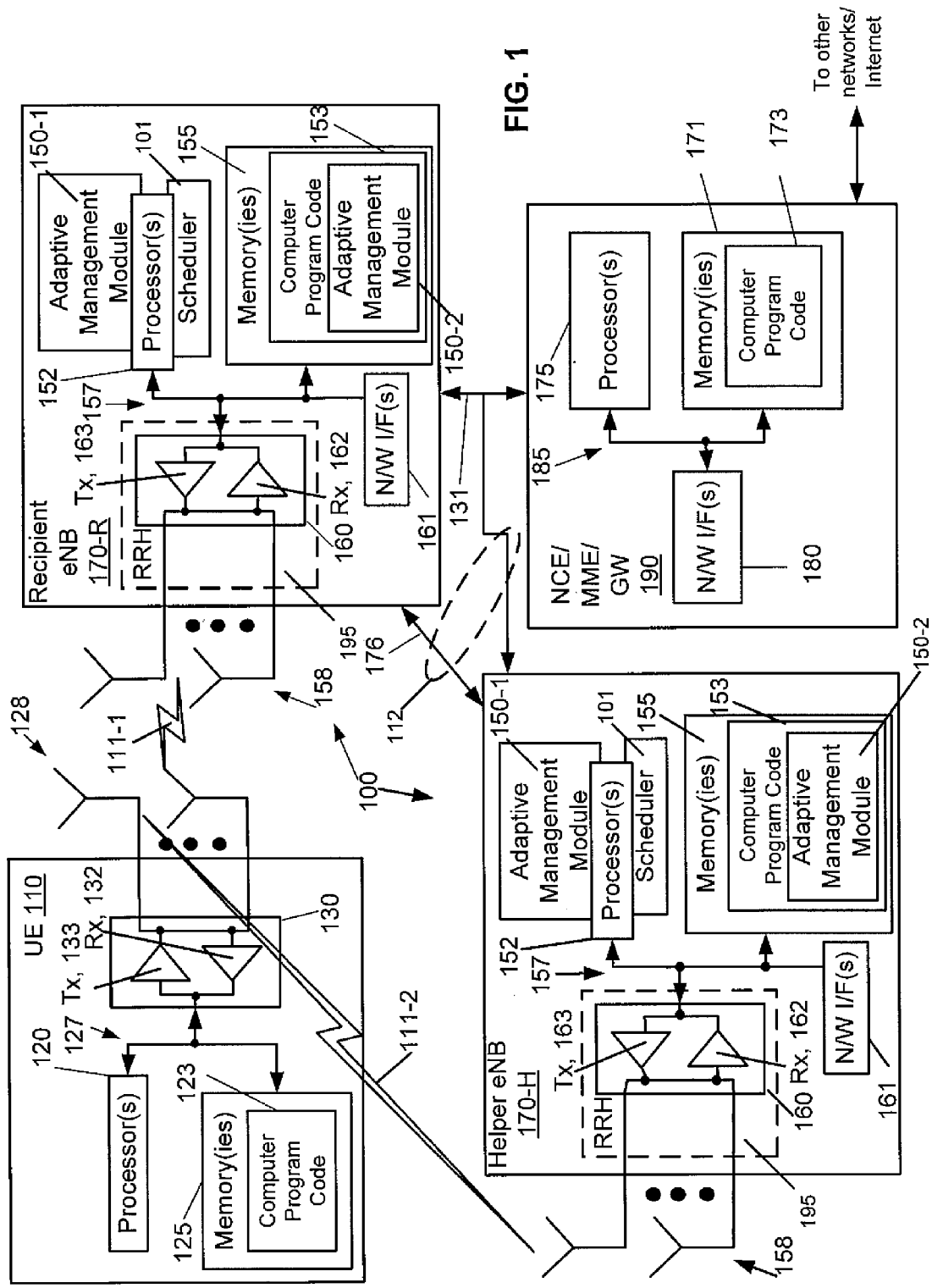
FIG. 1 is a block diagram of an example system in which some example embodiments may be practiced.

Turning to FIG. 1, this figure shows a block diagram of an example system in which some example embodiments may be practiced. In FIG. 1, a UE 110 is in wireless communication with a wireless network 100. The user equipment 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The one or more memories 125 and the computer program code 123 may be configured to, with the one or more processors 120, cause the user equipment 110 to perform one or more of the operations as described herein. In particular, the UE 110 communicates with eNBs 170 via corresponding wireless links 111. It is noted that a commonly used shorthand for a user equipment is the term "user". The term "user" herein is therefore considered to be the same as "user equipment", except in those instances where the term "user" refers to a person using a user equipment.

For cooperative uplink reception, transmissions from the UE in UL are received by multiple eNBs 170, of which there are two eNBs 170 shown in FIG. 1. In this example, the eNB 170-R is the recipient eNB, and the eNB 170-H is a helper eNB. There could be one or multiple helper eNBs, but only one helper eNB is shown in FIG. 1. The helper eNBs 170-H send information based on the reception of the transmission from the UE 110 to the recipient eNB 170-R.

The eNBs 170-R and 170-H are base stations that provide access by wireless devices such as the UE 110 to the wireless network 100. In this example, both eNBs 170-R and 170-H are assumed to be similar and thus one eNB is used as an example here. The eNB 170 (either 170-R or 170-H) includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The eNB 170 includes an adaptive management module 150, comprising one of or both parts 150-1 and/or 150-2, which may be implemented in a number of ways. The adaptive management module 150 may be implemented in hardware as adaptive management module 150-1, such as being implemented as part of the one or more processors 152. The adaptive management module 150-1 may be implemented also as an integrated circuit or through other hardware such as a programmable gate array. In another example, the adaptive management module 150 may be implemented as adaptive management module 150-2, which is implemented as computer program code 153 and is executed by the one or more processors 152. For instance, the one or more memories 155 and the computer program code 153 are configured to, with the one or more processors 152, cause the eNB 170 to perform one or more of the operations as described herein. The eNB 170 may also include a scheduler 101, which may also be implemented as part of computer program code 153 or as hardware, or as some combination of these.

The one or more network interfaces 161 communicate over a network such as via the links 176 and 131. Two or more eNBs 170 communicate using, e.g., link 176. The link 176 may be wired or wireless or both and may implement, e.g., an X2 interface. In an example, a backhaul link 112 comprises one or both of the links 176 and 131.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195, with the other elements of the eNB 170 being physically in a different location from the RRH, and the one or more buses 157 could be implemented in part, e.g., as fiber optic cable to connect the other elements of the eNB 170 to the RRH 195.

Note that one possible implementation is referred to herein as MAAS (Multi-Aperture Antenna Selection), which is where antennas from eNBs 170 and/or RRHs 195 are selected based on certain criteria. See, e.g., U.S. patent Ser. No. 13/524,108, by Fleming et al., filed on Jun. 15, 2012. The information from those antennas is processed by the recipient eNB 170-R to decode data from a user equipment 110.

The wireless network 100 may include a network control element (NCE) 190 that may include MME/SGW functionality, and which provides connectivity with a further network, such as a telephone network and/or a data communications network (e.g., the Internet). The eNB 170 is coupled via a link 131 to the NCE 190. The link 131 may be implemented as, e.g., an S1 interface. The NCE 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the NCE 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented using hardware such as processors 152 or 175 and memories 155 and 171.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples.

Typically, a "cell" (not shown in FIG. 1 but shown in other figures) and the eNB 170 that creates the cell are treated as being the same. However, there are times when this treatment may not be the case. For instance, a "cell" is actually a physical area. It is noted that the description herein indicates at times that "cells" perform functions, but it should be clear that the eNB that forms the cell will perform the functions. For ease of reference, though, the term "cell" will be used to describe both a physical area and functionality performed within that area. Furthermore, a cell makes up part of an eNB. That is, there can be multiple cells per eNB. For instance, there could be three cells for a single eNB carrier frequency and associated bandwidth, each cell covering one-third of a 360 degree area so that the single eNB's coverage area covers an approximate oval or circle. Furthermore, each cell can correspond to a single carrier and an eNB may use multiple carriers. So if there are three 120 degree cells per carrier and two carriers, then the eNB has a total of 6 cells.

Now that an example system has been described, more detail is provided to enable understanding of the embodiments and also about some example embodiments. As previously described, a "fake" ACK may be used by a base station and sent to a UE, for instance to quell retransmission from the UE and allow a different UE to be scheduled. In examples herein, a "fake" ACK is sent by a base station to a UE for a different purpose. In particular, sending "fake" ACKs help to manage backhaul latency in UL CoMP. This is a new use for the "fake" ACKs.

Turning to a description of why management of backhaul latency is beneficial, uplink coordinated multi-point (UL CoMP) joint reception is a promising technique to improve cell-edge and average user throughput by jointly receiving signals from multiple cells. Theoretical work shows UL CoMP can increase user throughput, mostly for cell-edge users and increase fairness among users. It also promises average user gain over 80 percent and three fold gains for cell-edge users, but practical constraints such as imperfect channel knowledge, backhaul bandwidth and latency are major bottlenecks. The standard X2 interface can be used by cells to communicate for UL CoMP.

Regarding CoMP coordination scenarios, there are proposals to select an optimal CoMP cluster dynamically. See the following: A. Papadogiannis, D. Gesbert, and E. Hardouin, "A dynamic clustering approach in wireless networks with multi-cell cooperative processing", Communications, 2008. ICC '08. IEEE International Conference, pp. 4033-4037, May 2008; J. Zhang, R. Chen, J. Andrews, A. Ghosh, and R. Heath, "Networked MIMO with clustered linear precoding", IEEE Tran. Wireless Commun., vol. 8, no. 4, pp. 1910-1921, April 2009; and J. Hoydis, M. Kobayashi, and M. Debbah, "On the optimal number of cooperative base stations in network MIMO", CoRR, vol. abs/0912.4595, 2009. A dynamic clustering algorithm (e.g., in A. Papadogiannis et al.) is proposed to include cells into CoMP sets using instantaneous channel state information. Every time instant, a controller such as an eNB chooses cells for a particular user in a cooperating cluster which results in performance improvements. Other approaches concern the issue of selecting optimal cells in downlink to cooperate and increase user performance. See J. Zhang et al. and J. Hoydis et al. All of these works provide detailed analysis to understand problem of cooperating cluster and its impact on performance.

For UL CoMP, a set of cells coordinate among themselves in their signal processing functionality to provide enhanced link capacity to users. The coordination among cells can be based on backhaul architecture, cell density and user mobility. The various approaches for coordination are defined in 3GPP LTE, based on the deployment such as network centric, user specific and network-centric-user assisted. For 3GPP LTE, see E. Pateromichelakis et al, "On the Evolution of Multi-Cell Scheduling in 3GPP LTE/LTE-A", IEEE Communications Surveys & Tutorials, vol. 15, no. 2, pp. 707-717, July 2012. For deployment examples, see A. Papadogiannis et al. and "Setup of CoMP cooperation areas", 3rd Generation Partnership Project (3GPP), Nokia Siemens Networks RI-090725, February 2009. Static CoMP cluster and multi-antenna aperture selection (MAAS) may be used to select optimal antennas used for receiver processing. In a standard hexagonal layout, various coordination scenarios among cells are possible such as intra-site, 9-cell cluster and inter-site coordination. Using 9-cell cluster coordination, the boundary cells cannot coordinate with adjacent cells of other clusters. Hence, intra-site coordination is recommended if backhaul between sites is not effective, and inter-site if backhaul has less constraint in terms of bandwidth and latency. Discussion of simulations and analyses of these various coordination scenarios is presented below.

One technique for performing UL CoMP is called Multi-Antenna Aperture Selection (MAAS). In CoMP, a receiver estimates the channel associated with user link. A weak link results in error in estimation, and hence throughput degradation. Multi-antenna aperture selection (MAAS) (see S. Nagaraj, et al., "Multi-cell distributed interference cancellation for Co-operative Pico-cell clusters", IEEE Global Communications Conference (GLOBECOM), pp. 4193-4199.2012) becomes important to have a user-specific antenna selection algorithm. For example, MAAS for a cell-edge user, while adding maximum receivers as an aperture set, may includes many weak links which can result in loss in throughput. For instance, any cell at which the user is a cell-edge user will typically have poor reception from the user. Meanwhile, MAAS for a cell-center user may choose a maximum antenna set as a receiver in order to increase the effective SINR (signal to interference and noise ratio).

It is therefore beneficial to have an algorithm that is user-specific in order to provide most benefit from MAAS. Various approaches for antenna selection are described in K. Zeineddine et al, "Antenna Selection for Uplink CoMP in Dense Small-cell Clusters", IEEE Signal Processing Advances in Wireless Communications (SPAWC), pp. 81-85, 2013. For the discussions of CoMP coordination scenarios below, a simple and effective approach was used for antenna set selection. Two parameters were used to enable the antenna selection i.e., minSinrThreshold and sinrRangeLimit. The former ensures that for a user SINR at an optional cell for aperture selection must be greater than minSinrThreshold. The latter denotes the SINR difference in dB between user serving cell and optional cell must be less than sinrRangeLimit. These metrics are configuration parameter in simulations, and can be tuned depending on the deployment. For example, in a dense scenario, sinrRangeLimit shall be set lower than in a macro scenario to ensure weak links are not included in CoMP aperture set.

Concerning effect of backhaul latency on UL CoMP, consider a set of cells that are serving a set of UEs 110. For purposes of UL CoMP, each cell needs "help" from another cell. The recipient cell 170-R uses this help in order to decode signals from the user equipment 110. This help can be in the form of, e.g., baseband signals (for joint reception-based UL CoMP, or JR-CoMP) and MAAS, or decoded data signals (for distributed interference cancellation-based CoMP, or DIC-COMP). These signals are transmitted using a packet-switched or a circuit-switched network, depending on architecture and deployment. Generally, performance of UL CoMP is studied in ideal backhaul, or with very low latency of, e.g., 1 ms, but in reality, backhaul is non-ideal with high latency that can ranging near 5 or 10 ms. This high latency can be caused due to a limiting capacity of the backhaul link or bandwidth sharing restrictions.

A non-ideal backhaul may be modelled as a link with a fixed latency of 0, 5, 10 ms. If the help arrives with some delay, a scheduler 101 in the recipient eNB 170-R waits to decode the user data on time. In LTE, there is a fixed time on the delay for transmitting an ACK/Nack to the user, which may be violated if the help arrives with some delay. As described above, a basic approach to address backhaul latency is for the scheduler 101 to provide a "fake ACK" to the UE 110, and decode a packet from the UE 110 only after CoMP help arrives. Consider the situation where there is only a single user in a cell. This means that for a packet transmitted at time t, the next available transmission for the user on the same HARQ process id cannot happen until t+8 ms later, due to synchronous HARQ delay in LTE UL. A next available opportunity for the same HARQ process id is t+16 ms later for 5 ms backhaul latency and t+24 ms for 10 ms backhaul latency. If decode fails even after CoMP combining, the eNodeB 170-R can provide a PDCCH grant to the UE 110 to continue the previous packet transmission, and this ensures there is no loss of the packet. A PDCCH grant is a grant sent by the eNB 170-R on PDCCH to enable the UE to repeat the packet on PUSCH.

However, if there are more users active in the cell, another user can be scheduled for a t+18 ms opportunity for the 5 ms backhaul latency. This means that the "pipe" can be full if there are enough users to fill in. The performance impact of large non-ideal backhaul latency can be observed in a finite buffer scenario where users do not always have data to transmit.

Some example embodiments herein propose various approaches to perform adaptive management of helper cells (e.g., eNB 170-R) based on environment (such as load, UL CoMP usage, serving cell decoding ability, and the like). Ideal backhaul is considered as the best case, and various approaches listed below are proposed to enable suitable UL CoMP performance even with gradient degradation caused by backhaul with larger delay. The approaches are verified under various scenarios/use cases and varying load conditions.

Figure 2:
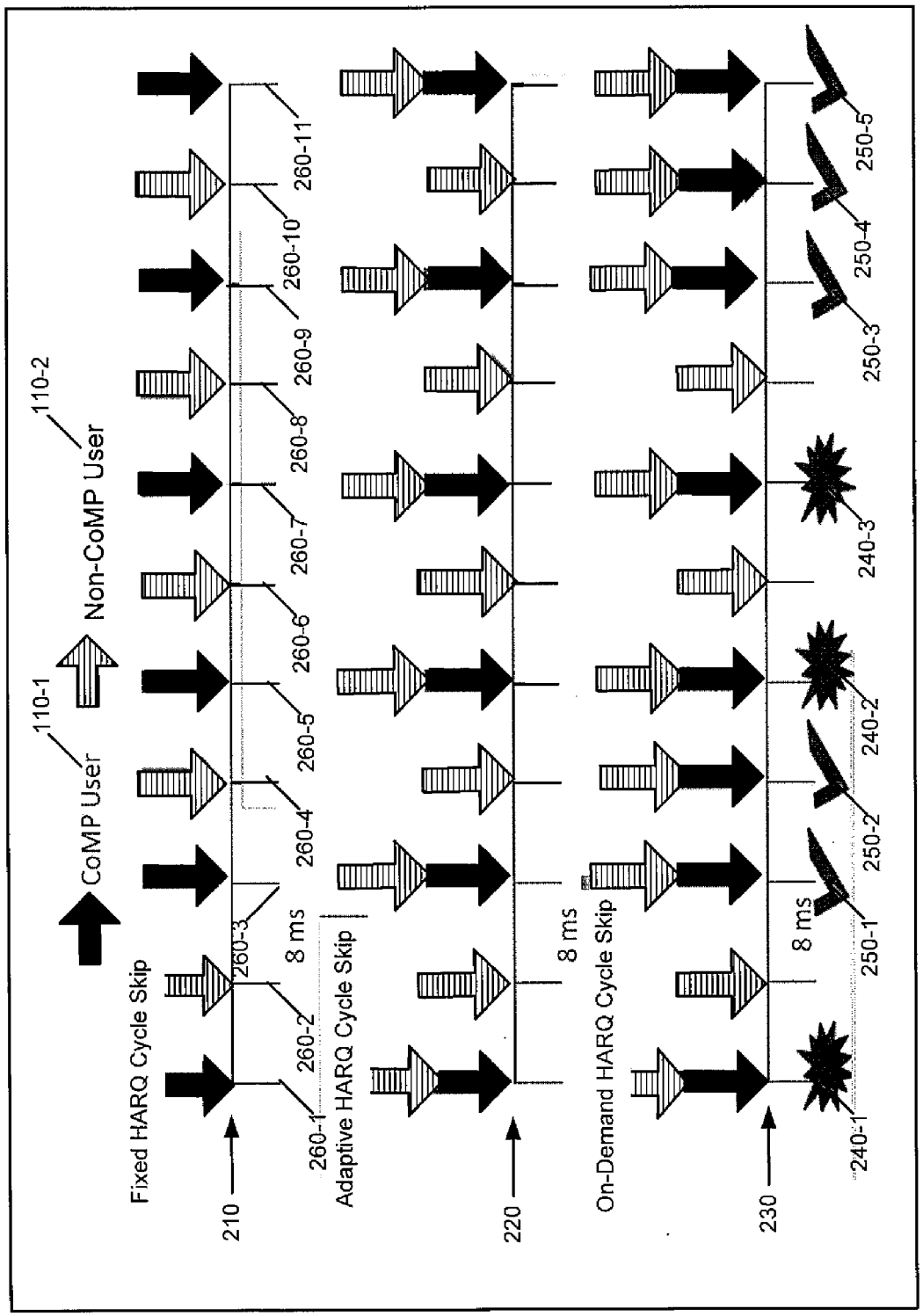
FIG. 2 presents various approaches of non-ideal backhaul for uplink joint reception using co-operation, and only one HARQ process per user is defined for simplicity and understanding.

Three examples are now presented. Reference may also be made to FIG. 2, which presents various approaches of non-ideal backhaul for uplink joint reception using co-operation. In FIG. 2, only one HARQ process per user is defined for simplicity and understanding. FIG. 2 illustrates scheduling of a user performing CoMP ("CoMP User 110-1") and a user not performing CoMP ("Non-CoMP User 110-2"). For CoMP users 110-1, helper cells (e.g., eNBs 170-H) transmit information received from the CoMP user to the recipient cell (e.g., eNB 170-R). For non-CoMP users 110-2, the "recipient" cell (e.g., eNB 170-R) receives information from the user equipment 110 and there are no helper cells. There are 8 ms increments on the horizontal axis. HARQ cycles 260-1 through 260-11 are illustrated. An arrow represents a time when a user's HARQ process is eligible to send information based on a PDCCH grant, or able to schedule. In 210, since all users skip HARQ cycle (5 ms latency), both CoMP/non-CoMP users will have alternative opportunities, while in 220, only a CoMP user will skip a HARQ cycle. In an exemplary embodiment, to skip a HARQ cycle, a user receives a "fake" ACK so the user is ignorant of scheduler implementation. This requires no change in standard user implementation. By sending a "fake" ACK, scheduler 101 is buying more time to receive help from "helper" cells and complete the reception process, but still uses HARQ retransmissions to improve reliability of UL transfer.

Example 1

Fixed HARQ Cycle Skip

This example is illustrated by reference 210 in FIG. 2. In this approach, all users are scheduled to skip HARQ cycles irrespective of whether they are UL CoMP users 110-1 or not. This is a simple technique, but may provide the worst performance relative to other embodiments. For 5 ms latency, a user 110 skips one HARQ cycle for each parallel HARQ process id, and skips two HARQ cycles for 10 ms latency.

Figure 3:
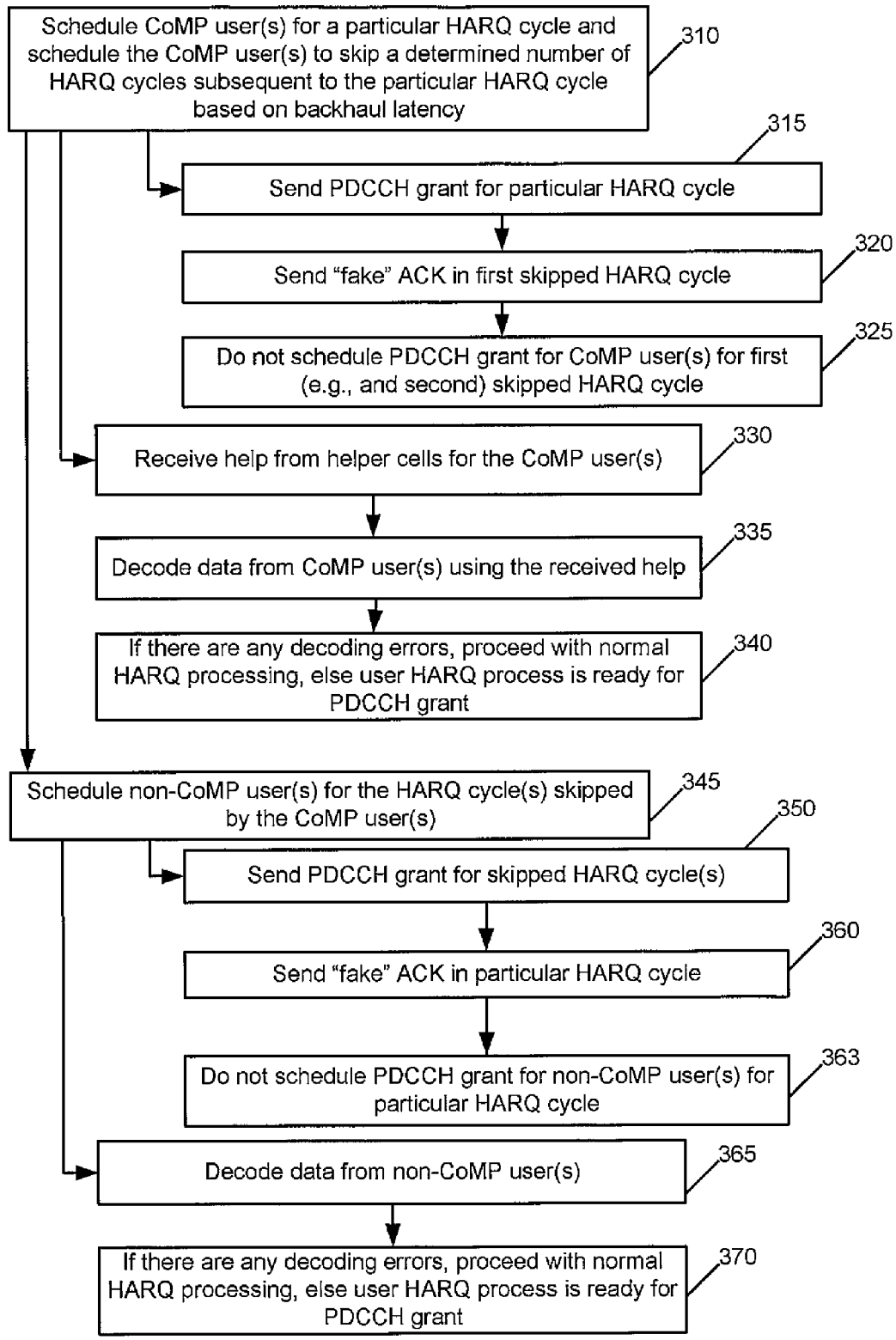
FIG. 3 is a logic flow diagram performed by an eNB for cooperative uplink reception suitable for non-ideal backhaul for the example of Fixed HARQ Cycle Skip, and illustrates the operation of an example method, a result of execution of computer program instructions embodied on a computer readable memory, and/or functions performed by logic implemented in hardware, in accordance with an example embodiment.

FIG. 3 is a flowchart illustrating the example of reference 210 in more detail. FIG. 3 illustrates the operation of an example method, a result of execution of computer program instructions embodied on a computer readable memory, and/or functions performed by logic implemented in hardware, in accordance with an example embodiment. The blocks in FIG. 3 may be considered to be interconnected means for performing the functions in the blocks. The blocks of FIG. 3 are assumed to be performed by a receipt eNB 170-R, e.g., under control of an adaptive management module 150 (which may also control the scheduler 101). FIG. 3 is separated into two sections, with scheduling for CoMP users 110-1 performed using blocks 310-340 and scheduling for non-CoMP users 110-2 performed using blocks 345-370. FIG. 3 is also used to illustrate how the Fixed HARQ Cycle Skip example fits into a "normal" HARQ process. For Fixed HARQ Cycle Skip, the CoMP and no-CoMP users behave the same. The main difference is that the eNB 170-R for a CoMP user waits for information from helper cells for decoding, while the eNB 170-R for non-CoMP user does not wait.

Concerning scheduling for CoMP users 110-1, in block 310, the eNB 170-R schedules CoMP user(s) for a particular HARQ cycle and schedules the CoMP user(s) to skip a determined number of HARQ cycles subsequent to the particular HARQ cycle based on backhaul latency. The eNB 170-R can determine backhaul latency, e.g., by determining how long it takes for the eNB 170-R to receive help from the helper eNBs 170-H. For instance, an eNB can use its clock to find the latency of signal information received from helper cells. Blocks 315-325 illustrate an example of this scheduling. In block 315, the eNB 170-R sends a PDCCH grant for a particular HARQ cycle. For instance, for HARQ cycle 260-1, the eNB 170-R can send a PDCCH grant to allow the UE 110 to send information in the PUSCH. In block 320, the eNB 170-R sends a "fake" ACK in the first skipped HARQ cycle 260-2. In FIG. 2, this corresponds to HARQ cycle 260-2. By "PDCCH grant", it is meant that the eNB sends a grant to the UE using PDCCH, and the grant allows the UE to send information on the PUSCH. The "fake" ACK is provided to the user to ensure no retransmission is sent by the user at next scheduling instance. In addition to sending the "fake" ACK, the eNB also does not schedule the PUSCH for the user. That is, the scheduler 101 does not provide a PDCCH grant to this user's HARQ process until help is received from helper cells. This ensures that the user HARQ process will not be scheduled until then, hence skipping a HARQ cycle 260 for the user HARQ process). Thus, in block 325, the eNB 170-R does not schedule a PDCCH grant for CoMP user(s) for the first skipped HARQ cycle 260 (such as cycle 260-2). Additionally, if multiple HARQ cycles are to be skipped, the eNB 170-R does not schedule a PDCCH grant for CoMP user(s) for, e.g., a second skipped HARQ cycle (e.g., the HARQ cycle 260-3).

The operation of blocks 320 and 325 allows the eNB 170-R to receive help from helper cells for the CoMP user(s). That is, by performing blocks 320 and 325, the eNB 170-R provides extra time in order for the eNB 170-R to receive help in block 330. In block 330, the eNB 170-R receives help for the UE 110 from the helper cells. Note that, prior to block 330, the eNB 170-R has communicated with certain helper eNBs 170-H in order for the helper eNBs 170-H to be configured to receive a signal from the UE 110 and to forward helper information from the helper eNBs 170-H to the recipient eNB 170-R. In block 335, the eNB 170-R decodes data from the CoMP user(s) using the received help. In block 340, if there are any decoding errors, the eNB 170-R proceeds with normal HARQ processing. For instance, the eNB could send the NDI (New Data Indicator) bit but not toggle the NDI bit. Further, if the decode fails even after CoMP combining, the recipient cell sends a PDCCH grant to continue the previous packet transmission, and this ensures there is no loss of the packet. Additionally, if there are no decoding errors, the eNB 170-R deems the user HARQ process as ready for PDCCH grant.

Concerning scheduling for non-CoMP users 110-2, in block 345, the eNB 170-R schedules non-CoMP user(s) for the HARQ cycle(s) skipped by the CoMP user(s). For instance, a non-CoMP user is scheduled for the HARQ cycle 260-2, which is skipped by the CoMP user. One example of block 345 is illustrated by blocks 350 and 360. In block 350, the eNB 170-R sends a PDCCH grant for skipped HARQ cycle(s) (e.g., HARQ cycle 260-2) to the non-CoMP user(s). In block 360, the eNB 170-R sends a "fake" ACK in the particular HARQ cycle, e.g., in HARQ cycle 260-3. The eNB 170-R in block 363 also does not schedule PDCCH grant for non-CoMP user(s) for a particular HARQ cycle such as HARQ cycle 260-3.

In block 365, the eNB 170-R decodes data from the non-CoMP user(s). In block 370, if there are any decoding errors, the eNB proceeds with normal HARQ processing. Additionally, if there are no decoding errors, the eNB 170-R deems the user HARQ process as ready for PDCCH grant.

In an exemplary embodiment, an apparatus comprises a means for performing the method shown in FIG. 3. Additionally, another example is an apparatus that includes one or more processors and one or more memories including computer program code. The one or more memories and the computer program code are configured to, with the one or more processors, cause the apparatus to perform the method of FIG. 3.

Example 2

Adaptive HARQ Cycle Skip

This example is illustrated by reference 220 in FIG. 2. This method provides an intelligent way to decrease UL CoMP performance loss caused by backhaul latency. The worst results with this approach may occur with a baseline IRC receiver, and when no user performs UL Joint Reception (JR). This happens mainly at low load conditions. The decision of skipping HARQ cycles for a HARQ process id can be defined by the following two criteria for example:

a. Load: If the cell is heavily loaded so as to fill an empty HARQ cycle, only then are CoMP UEs scheduled to perform UL joint reception; and b. UL CoMP User: A HARQ cycle is skipped for only those users which participate in UL Joint Reception (JR) CoMP, where automatic selection of suitable reception path occurs (e.g., antenna aperture selection by selecting a set of antennas).

Figure 4:
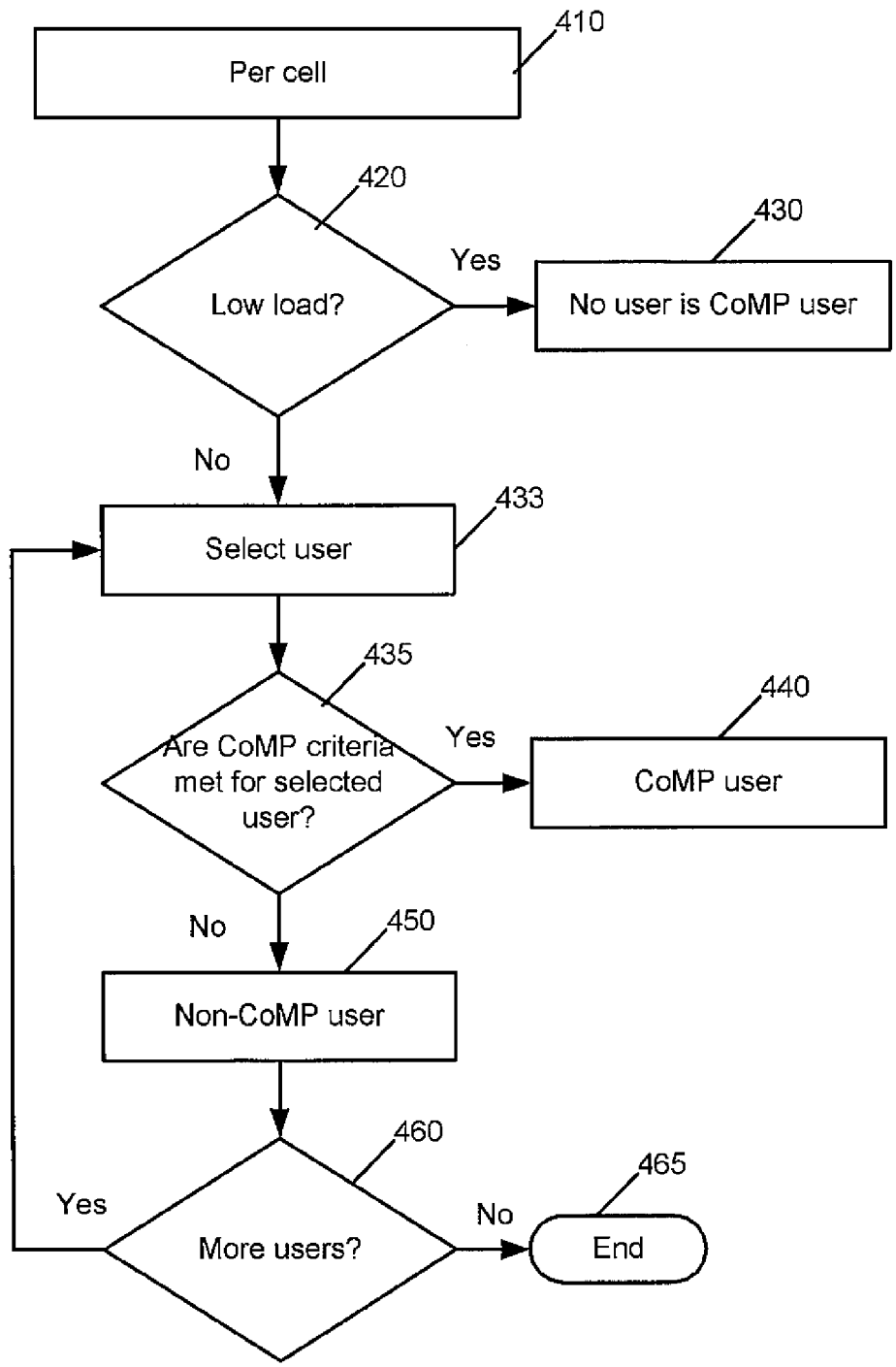
FIGS. 4 and 5 are logic flow diagrams performed by an eNB for cooperative uplink reception suitable for non-ideal backhaul for the example of Adaptive HARQ Cycle Skip, and illustrate the operation of an example method, a result of execution of computer program instructions embodied on a computer readable memory, and/or functions performed by logic implemented in hardware, in accordance with an example embodiment.
Figure 5:
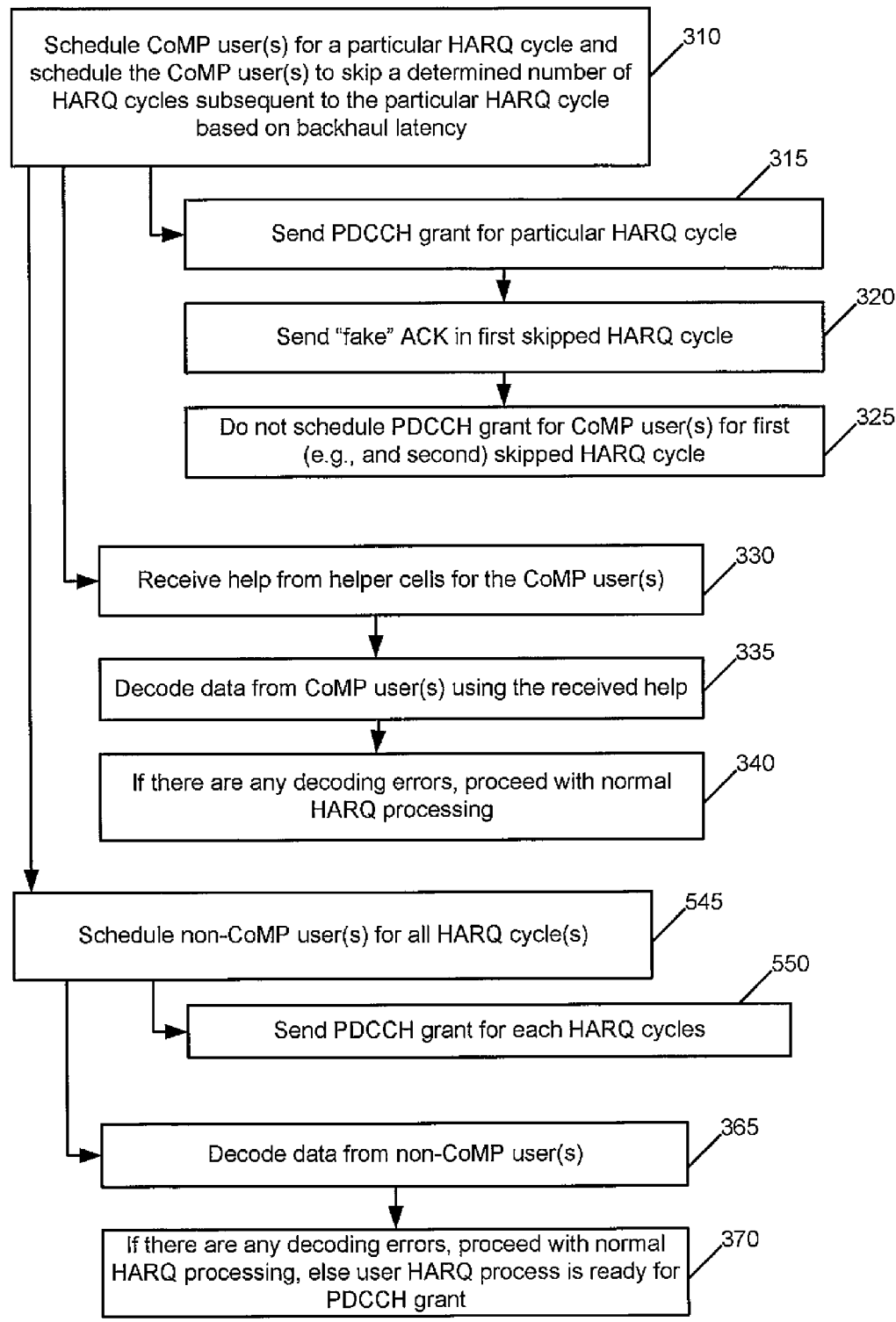

Example 2 is further illustrated by FIGS. 4 and 5, which are logic flow diagrams performed by an eNB for cooperative uplink reception suitable for non-ideal backhaul for the example of Adaptive HARQ Cycle Skip. These figures also illustrate the operation of an example method, a result of execution of computer program instructions embodied on a computer readable memory, and/or functions performed by logic implemented in hardware, in accordance with an example embodiment. The blocks in FIGS. 4 and 5 may be considered to be interconnected means for performing the functions in the blocks. FIG. 4 is an example of a flow for handling the load criterion of 2.a above, and FIG. 5 is an example of a flow for handling UL CoMP users (and non-CoMP users) as in 2.b above. An eNB 170-R is assumed to perform the methods of FIGS. 4 and 5, e.g., under control of the adaptive management module 150 and the scheduler 101.

The flow of FIG. 4 selects CoMP and non-CoMP users, in dependence on load in the cell. Reference 410 indicates that the flow of FIG. 4 is performed on a per-cell basis. In block 420, the eNB 170-R determines whether load in the cell is low. Low and high load are defined using backhaul latency: if backhaul latency is 5 ms, then having two or more users per cell will suffice as high load, while for 10 ms, high load in an example requires three or more users per cell. Criteria to determine low or high loads can be set based on the latency measured by cell to get help from a helper eNB 170-H. If there is low load (block 420=Yes), the eNB 170-R in block 430 sets no user as a CoMP user 110-2. That is, all users in the cell are set to be non-CoMP users 110-2. If there is high load (block 420=No), for each user in the cell, it is determined whether the user meets CoMP criteria. This criteria may include the criteria described above for the MAAS algorithm and may include the two parameters described above that were used to enable the antenna selection i.e., minSinrThreshold and sinrRangeLimit. This occurs in blocks 435-460. One user of multiple users in the cell is selected in block 433. If the selected user meets CoMP criteria (block 435=Yes), the user is chosen as a CoMP user 110-1 (block 440). If a user does not meet CoMP criteria (block 435=No), the user is chosen as a non-CoMP user 110-2 (block 450). Block 460 determines whether there are additional users that have not been selected as assigned as either a CoMP user 110-1 or a non-CoMP user 110-2. If so (block 460=Yes), the flow continues at block 433. If not (block 460=No), the flow ends in block 465.

Once CoMP/non-CoMP users are determined for high load conditions, then the flow in FIG. 5 is performed. FIG. 5 is similar to FIG. 3, and only differences between the two figures are mainly discussed herein. FIG. 5 is separated into two sections, with scheduling for CoMP users performed using blocks 310-340 and scheduling for non-CoMP users performed using blocks 545, 550, 365, and 370. Regarding CoMP users 110-2, blocks 310-340 are the same as in FIG. 3 and these blocks are not discussed in relation to FIG. 5.

Regarding non-CoMP users 110-2, in this approach, the scheduler 101 behaves with non-CoMP users as usual by sending NDI/PUSCH grant bit based on ACK/NACK. There is no change for non-CoMP users from a usual LTE UL procedure. Thus, in block 545, the eNB 170-R schedules non-CoMP user(s) for all HARQ cycles. For instance, in reference 220 of FIG. 2, the non-CoMP user(s) 110-2 are scheduled for all of the HARQ cycles 260. Block 550 is an example of block 545, and in block 550, the eNB 170-R sends a PDCCH grant to each non-CoMP user(s) 110-2 for each of the HARQ cycle(s) (e.g., where a non-CoMP user 110-2 is to send data in the CoMP cycle 260). Blocks 365 and 370 have been described above.

In an exemplary embodiment, an apparatus comprises a means for performing the methods shown in FIGS. 4 and 5. Additionally, another example is an apparatus that includes one or more processors and one or more memories including computer program code. The one or more memories and the computer program code are configured to, with the one or more processors, cause the apparatus to perform the methods of FIGS. 4 and 5.

Example 3

On-Demand HARQ Cycle Skip

This example is illustrated by reference 230 in FIG. 2. This approach may be the most complex to implement, but UL CoMP performance holds even for non-ideal backhaul. Only if an eNodeB 170-R fails to decode the user in its first attempt, then, the recipient cell asks the helper cells to forward the CoMP baseband signals from the UE 110 to recipient cell. The recipient cell then uses the CoMP signals to decode data from the UE 110. In other words, if the user can be decoded successfully using its serving cell (the recipient cell in this case), then no cooperation is required from helper cells.

In FIG. 2, references 240-1, 240-2, and 240-3 indicate a HARQ cycle where the eNodeB 170-R fails to decode the user in its first attempt. The eNB 170-R asks the helper cells to forward the CoMP baseband signals from the UE 110 to recipient cell. For the CoMP UE 110, the failure to decode at 240-1 means that the HARQ cycle at 260-2 is skipped so that the eNB 170-R can receive help from the helper cells and make another decoding attempt. References 250-1 and 250-2 indicate that there was a correct decoding of the user information for the HARQ cycles 260-3 and 260-4. The eNB 170-R again experiences a failure to decode from the CoMP UE 110 in 240-2 and 240-3 and corresponding HARQ cycles at 260-6 and 260-8 are skipped. References 250-3, 250-4, and 250-5 indicate that the eNB 170-R correctly decodes information received from the CoMP UE at these locations.

Figure 6:
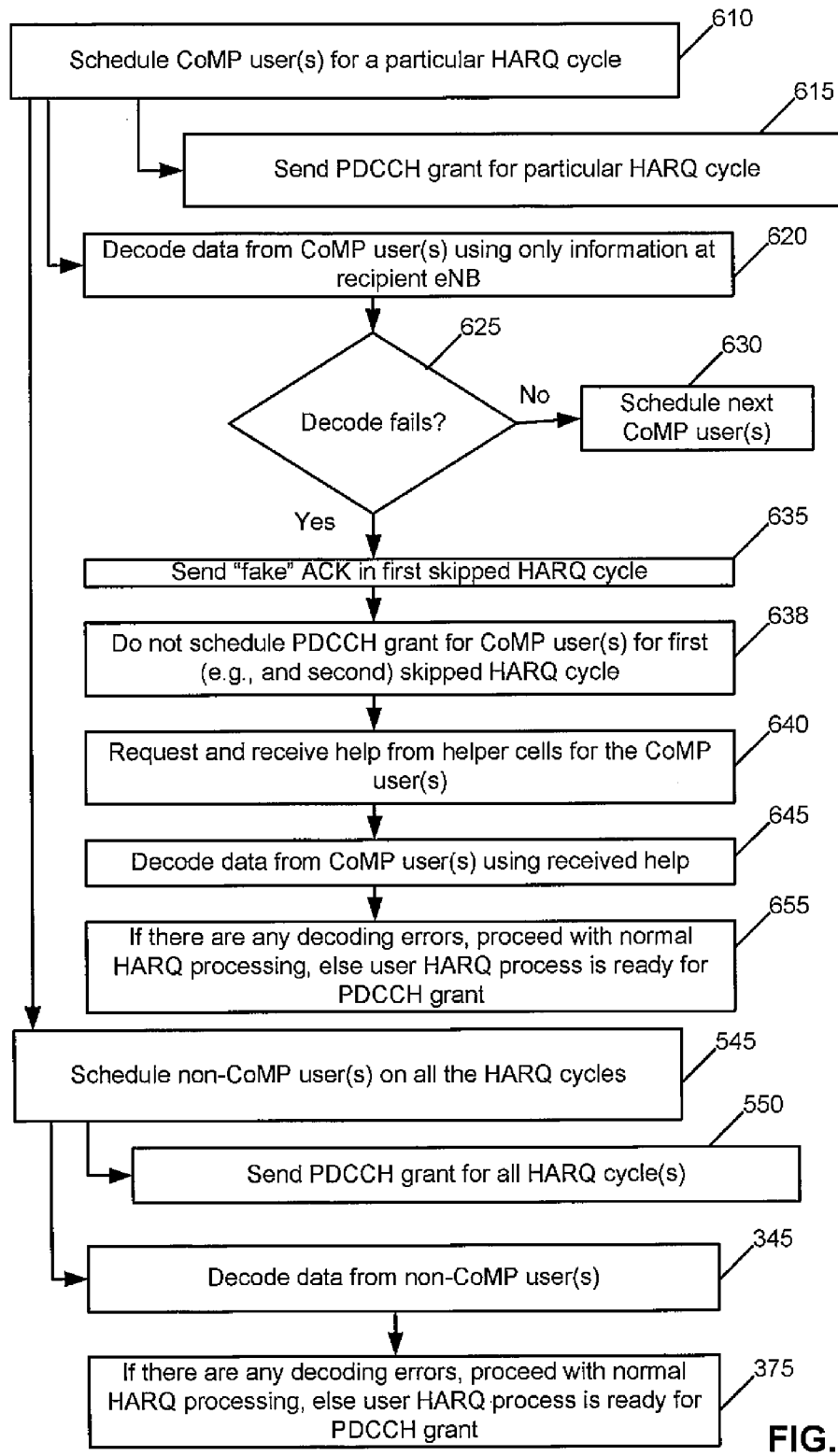
FIG. 6 is a logic flow diagram performed by an eNB for cooperative uplink reception suitable for non-ideal backhaul for the example of On-demand HARQ Cycle Skip, and illustrates the operation of an example method, a result of execution of computer program instructions embodied on a computer readable memory, and/or functions performed by logic implemented in hardware, in accordance with an example embodiment.

FIG. 6 explains Example 3 in additional detail. FIG. 6 is a logic flow diagram performed by an eNB for cooperative uplink reception suitable for non-ideal backhaul for the example of On-demand HARQ Cycle Skip. FIG. 6 illustrates the operation of an example method, a result of execution of computer program instructions embodied on a computer readable memory, and/or functions performed by logic implemented in hardware, in accordance with an example embodiment. The blocks in FIG. 6 may be considered to be interconnected means for performing the functions in the blocks. An eNB 170-R is assumed to perform the methods of FIG. 6, e.g., under control of the adaptive management module 150 and the scheduler 101. FIG. 6 is separated into two sections, with scheduling for CoMP users 110-1 performed using blocks 610-655 and scheduling for non-CoMP users 110-2 performed using blocks 545, 550, 345, and 375.

Concerning scheduling for CoMP users 110-1, in block 610, the eNB 170-R schedules CoMP user(s) for a particular HARQ cycle (e.g., 260-1 in FIG. 2). Block 615 is an example of how block 610 may be performed. In block 615, the eNB 170-R sends a PDCCH grant to the CoMP user(s) for the particular HARQ cycle.

In block 620, the eNB 170-R decodes data from CoMP user(s) using only information at recipient eNB 170-R from the CoMP user(s) 110-1. If the decode does not fail (block 625=No), the eNB 170-R schedules the next CoMP user(s) 110-1 in block 630 for the next CoMP cycle 260. If the decode fails (block 625=Yes), then in block 635, the eNB 170-R sends a "fake" ACK in the first skipped HARQ cycle. In reference 230, the "fake" ACK is sent in cycle 260-2 and the CoMP user(s) 110-1 are not scheduled for the subsequent HARQ cycle (e.g., 260-2). See block 638. If multiple HARQ cycles 260 are skipped, then the eNB 170-R does not schedule a PDCCH grant for the multiple HARQ cycles for the CoMP user(s). In block 640, the recipient cell requests the helper cells to forward the CoMP help (e.g., baseband signals) from the UE 110 to recipient cell and receives the help. In block 645, the eNB 170-R decodes data from CoMP user(s) using the received help. In block 655, the eNB 170-R, if there are any decoding errors, proceeds with normal HARQ processing as described above. Furthermore, if there are no decoding errors, the eNB 170-R determines the user HARQ process is ready for a PDCCH grant.

Concerning scheduling for non-CoMP users 110-2, in this approach, the scheduler 101 behaves with non-CoMP users as usual by sending NDI/PUSCH grant bit based on ACK/NACK. There is no change for non-CoMP users from a usual LTE UL procedure. Consequently, blocks 545, 550, 345, and 375 have already been discussed above. In the example of reference 230 of FIG. 2, the non-CoMP user(s) 110-2 are scheduled for each of the HARQ cycles 260.

It is noted that the load criteria described above in relation to Example 2 may also be used with Example 3. For instance, this may be implemented in the following way. High load and/or low load can be determined based on a threshold parameter, similar to the Adaptive HARQ skip. This criterion is added when the user equipment is selected as CoMP/non-CoMP user equipment. For example, if the load is low, then, no user equipment is considered for CoMP; else a user equipment is considered for Joint Reception CoMP.

Furthermore, in an exemplary embodiment, an apparatus comprises a means for performing the method shown in FIG. 6. Additionally, another example is an apparatus that includes one or more processors and one or more memories including computer program code. The one or more memories and the computer program code are configured to, with the one or more processors, cause the apparatus to perform the method of FIG. 6.

Performance impact of large non-ideal backhaul latency can be observed in a finite buffer scenario, where users do not always have data to transmit. In examples presented below, the 3GPP FTP Model 1 is used as a traffic source to observe variation in offered load. The variant of offered load tested is low, medium, and high load which corresponds to 2, 6, 10 Mbps of offered load respectively. Ideal backhaul is also observed to provide the best results possible using UL CoMP.

One advantage of using proposed approaches is to retain IRC performance with low load conditions and retain near ideal backhaul performance for higher loading condition. In a traditional approach as described in the Background section, there is loss in performance using UL CoMP with backhaul with large latency, but this can be avoided by using more intelligent and adaptive approaches such as Adaptive HARQ Skip and On-demand HARQ Skip as described above.

The validity of the approaches is reported on below in various scenarios, which are also potential cases for UL JR CoMP. It is noted that the results presented below are merely examples based on certain scenarios. There may be different results for other scenarios. Example use cases include the following.

1) Example Use Case of Macro Deployment

Figure 7:
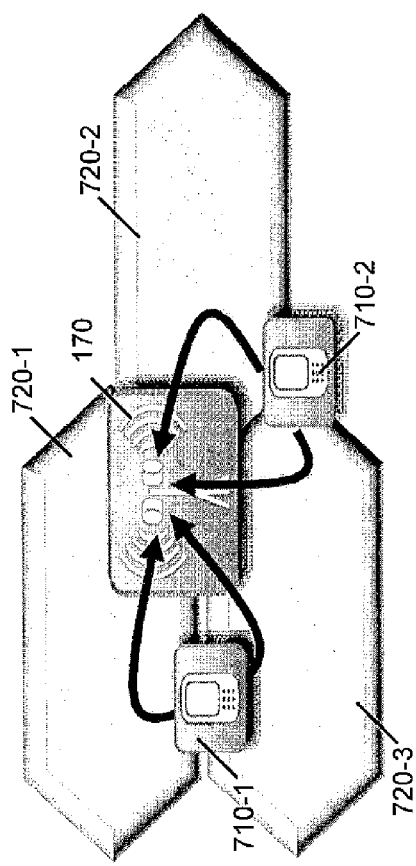
FIG. 7 presents intra-site cooperation where coordination between cells of same site is possible.
Figure 8:
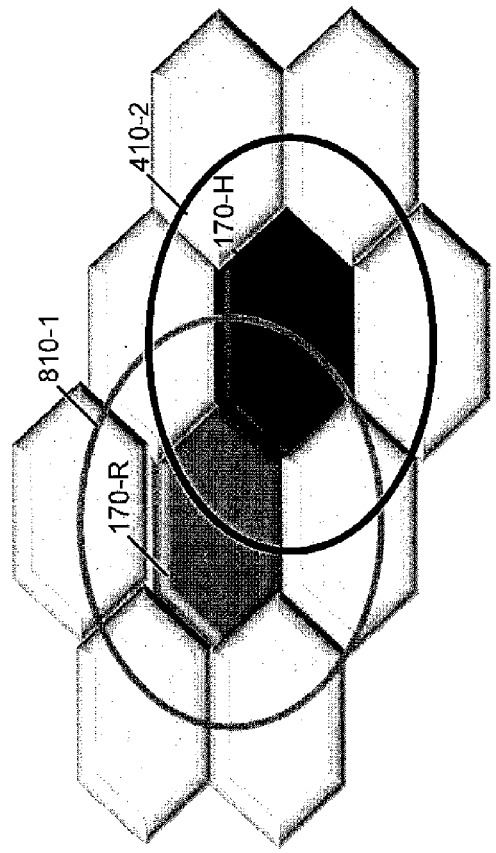
FIG. 8 presents inter-site cooperation where coordination between cells of neighbor sites is possible.

The proposed non-ideal backhaul approaches were studied for 500 m inter-site distance, 2.1 GHz carrier frequency. The two variants of co-operation are possible for macro deployment. FIGS. 7 and 8 describe the cooperation among cells.

a) Intra-site co-operation: Coordination among cells belonging to same site (FIG. 7); and b) Inter-site co-operation: Coordination among cells belonging to neighbor sites (FIG. 8).

In FIG. 7, one eNB 170 forms three cells 720-1, 720-2, and 720-3. The UE 710-1 is a CoMP UE for cells 720-1 and 720-3, while the UE 710-2 is a CoMP UE for cells 720-2 and 720-3. In FIG. 8, a recipient eNB 170-R creates a "cell" 810-1 and a helper eNB 170-H creates a "cell" 810-2. Note that the cells 810-1, 810-2 may be made from multiple smaller cells.

The performance of both cooperation techniques were observed under varying load conditions, with ideal (0 ms) and non-ideal backhaul (5 and 10 ms latency). Geometric mean was taken as a metric to evaluate various techniques and approaches. Geometric mean of user throughputs captures the metric that the PF scheduler maximizes. So this is one single number that captures the combined effect of cell-edge gain and average UE throughput gain.

For low load and larger backhaul latency, the Fixed HARQ Cycle Skip approach shows the performance loss of UL CoMP as compared to IRC receiver. While with Adaptive HARQ Cycle Skip, the gains using UL JR improve and approach ideal backhaul. Gain is observed for MAAS in spite of Fixed HARQ Cycle Skip over IRC receiver. This gain is mainly observed in high load conditions, so even if one skips a HARQ cycle for all users, the system is still heavily loaded enough to exploit MAAS gain. Adaptive HARQ Cycle Skip is able to perform better than the Fixed HARQ Cycle Skip approach, as there can be two effects, i.e., load and UL CoMP/UL non-CoMP users to identify whether a user skips a HARQ cycle or not. With the Adaptive HARQ Cycle Skip approach, UL CoMP gains are consistent for 5/10 ms latency. The results showing UL CoMP gain over IRC receiver are tabulated in Table 1, which is shown in FIG. 9. The on-demand HARQ Cycle Skip is expected to performance better the Adaptive HARQ Cycle Skip, since there is no need of skipping a HARQ cycle if a user can be successfully decoded at its server.

2) Example Use Case of Isolated Clustered Small-Cells Deployment

The proposed non-ideal backhaul approaches were studied for 20 m inter-site distance, 3.5 GHz carrier frequency, and this scenario can be observed as a very dense environment. The cooperation supported is complete system cooperation, where baseband processing units of all cells are co-located and there is an inter-connect fabric running between the units so that the processing units can interact with one another.

The performance of cooperation techniques was observed under varying load condition, with ideal (0 ms) and non-ideal backhaul (5 and 10 ms latency). Geometric mean was taken as a metric to evaluate various techniques and approaches. Geometric mean of user throughputs captures the metric that the PF scheduler maximizes. So this is one single number that captures the combined effect of cell-edge gain and average UE throughput gain.

For low load, Fixed HARQ Cycle Skip shows performance loss using UL CoMP with backhaul latency of 5 and 10 ms. Here, Adaptive HARQ Cycle Skip is better than Fixed HARQ Cycle Skip. This is possible, since with adaptive HARQ Skip technique, one ensures that users fall back to baseline in case of low load conditions. Here, Adaptive HARQ Cycle Skip only works on load based criteria, as "helpers" cells are fixed to three "helpers" for all users, so the loss as compared to ideal backhaul is higher as compared to other cases.

The results showing UL CoMP gain over IRC receiver are tabulated in Table 2, shown in FIG. 10. For non-ideal backhaul, using a fixed HARQ Cycle Skip approach provides a lower bound on performance, since all users skip HARQ to account for latency. With Adaptive HARQ Cycle Skip approach, the gains fall in between IRC receiver and ideal backhaul, as only selected users skip HARQ cycles based on CoMP use and load conditions. The On-Demand HARQ Cycle Skip is expected to performance better the Adaptive HARQ Cycle Skip, since there is no need of skipping a HARQ cycle if a user can be successfully decoded at its server. Resource utilization decreases by increase in latency and using the Fixed HARQ Cycle Skip approach, as all users skip a HARQ cycle, RBs sometimes are left empty.

3) Use Case of Heterogeneous Networks

Figure 11:
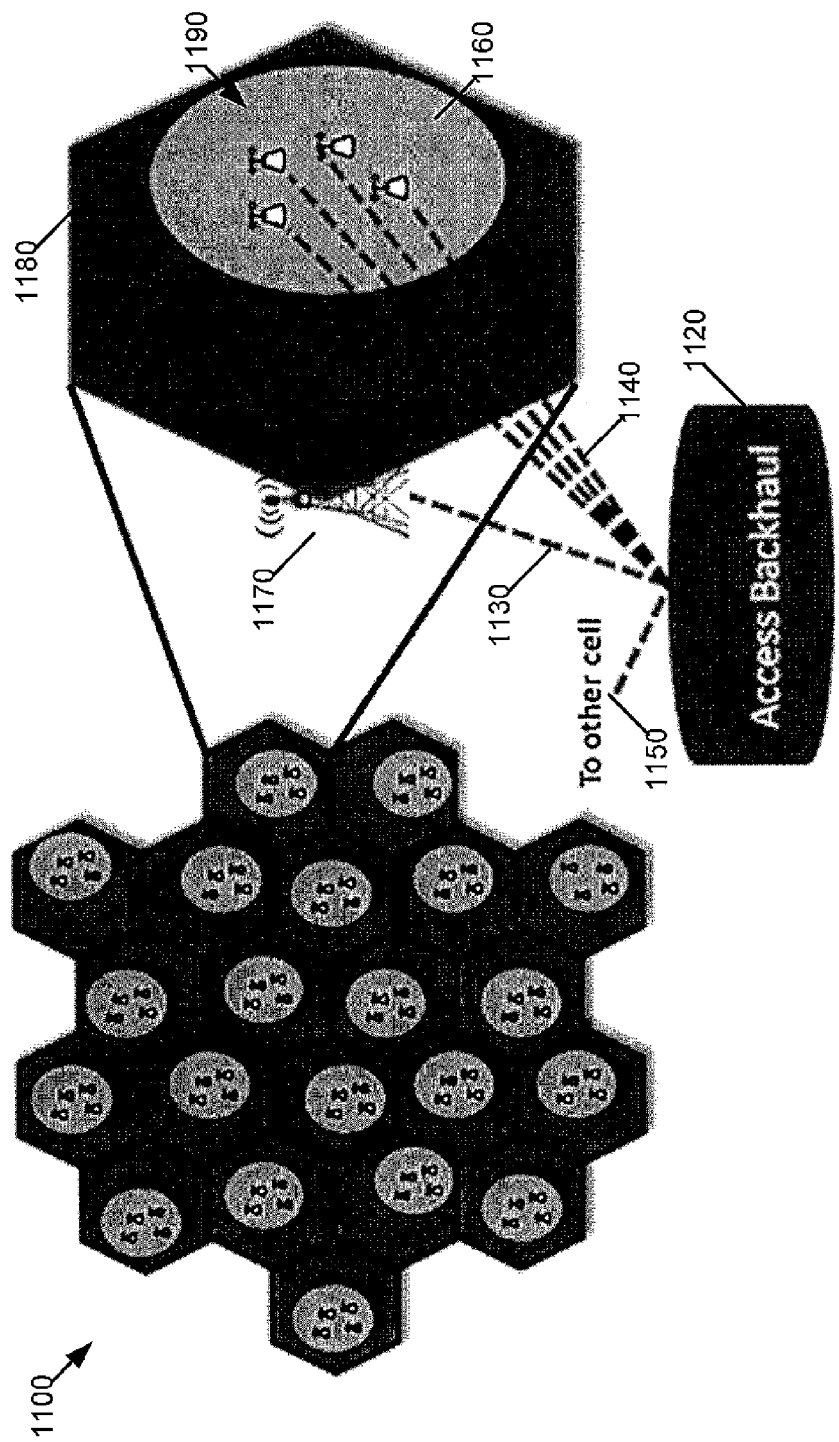
FIG. 11 illustrates heterogeneous deployment, showing both intra-macro and inter-small cells cooperation.

The proposed non-ideal backhaul approaches were studied for heterogeneous networks where macro and small cells both operate at a same carrier frequency of 2.1 GHz. Each macro has two small cells clustered within the macro cell. The following cooperation is described in FIG. 11. FIG. 11 shows a cluster 1100 of macro cells, of which cell 1180 is enlarged. The cell 1180 is formed using a frequency $f_1$ by an eNB 1170. A number of small cell eNBs 1190 create a subtending (e.g., underlying) cell area 1160. The access backhaul is represented by reference 1120, and possible links with the backhaul 1120 are represented by link 1150 (to other macro cell(s)), link 1130 (from the eNB 1170 to the backhaul 1120), and links 1140 (from each small cell eNB 1190 to the backhaul 1120).

a) Intra-macro cooperation: Coordination among cells belonging to a same site, such that macro-cell 1180 and subtending small-cells 1190 cooperate for CoMP; and b) Inter-small cells cooperation: Coordination among cells belonging to neighbor sites, such that only small cells 1190 within one cluster cooperate but macro-cells 1180 do not perform CoMP.

The performance of both cooperation techniques were observed under varying load conditions, with ideal (0 ms) and non-ideal backhaul (5 and 10 ms latency). Geometric mean was taken as a metric to evaluate various techniques and approaches. Geometric mean of user throughputs captures the metric that the PF scheduler maximizes. So this is one single number that captures the combined effect of cell-edge gain and average UE throughput gain.

The results showing UL CoMP gain over IRC receiver are tabulated in Table 3, shown in FIG. 12. Only Adaptive HARQ Cycle Skip results are observed, since for inter-small cell cooperation, macro users are not participating in UL JR, so there is no need to skip HARQ cycles for these users. High load of 10 Mbps offered load is observed as the data traffic source.

Much of the CoMP gain for small-cell users on the uplink can be achieved with cooperation only within the cluster, as intra-cluster interference is the dominant factor for poor performance. With the Adaptive HARQ Cycle Skip approach, we are able to approach ideal backhaul, since adaptation can be based on both load and intelligent switching between CoMP/non-CoMP UEs.

Figure 13:
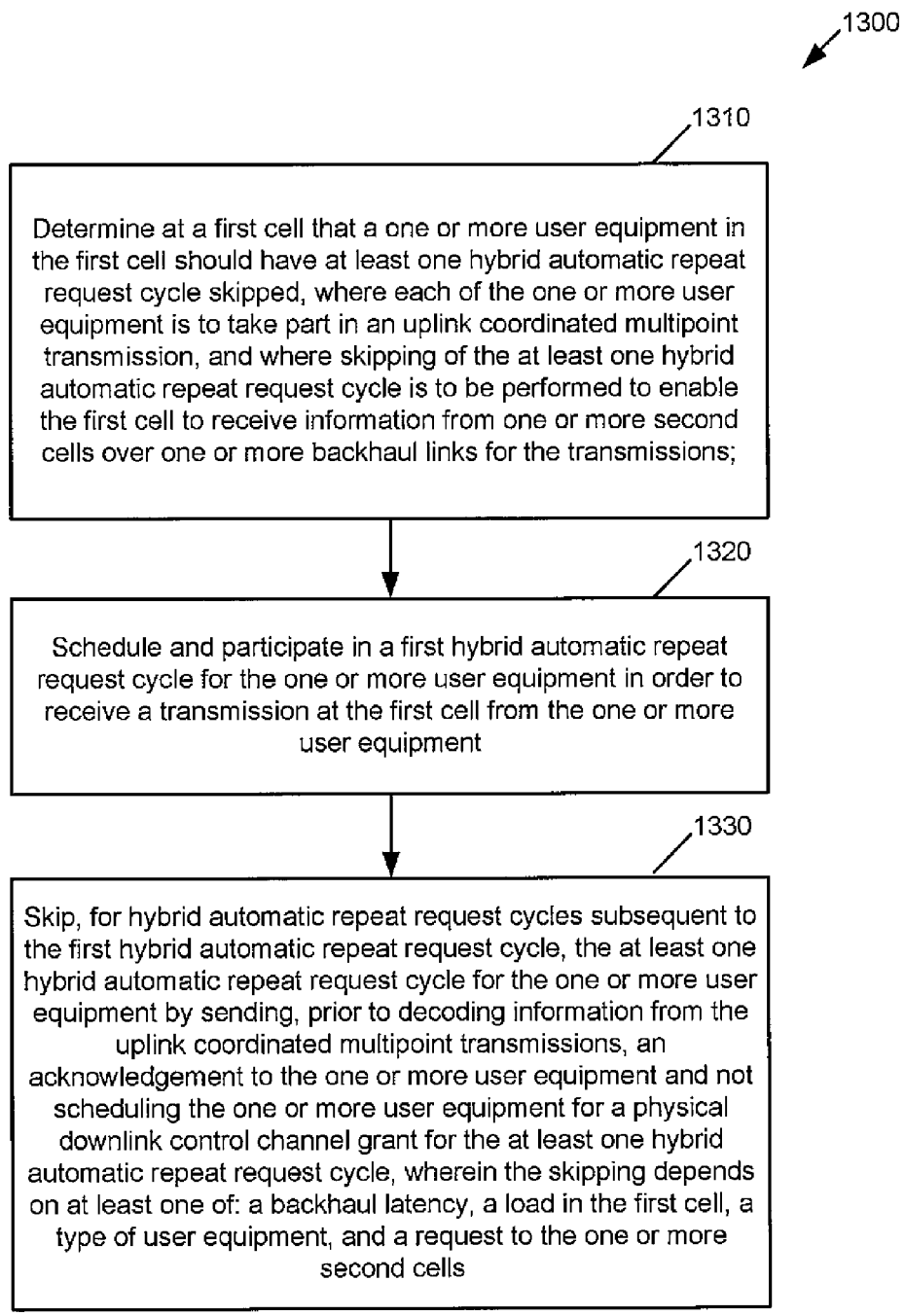
FIG. 13 is a logic flow diagram performed by an eNB for cooperative uplink reception suitable for non-ideal backhaul, and illustrates the operation of an example method, a result of execution of computer program instructions embodied on a computer readable memory, and/or functions performed by logic implemented in hardware, in accordance with an example embodiment.

Turning to FIG. 13, this figure a logic flow diagram performed by an eNB for cooperative uplink reception suitable for non-ideal backhaul. This figure illustrates the operation of an example method 1300, a result of execution of computer program instructions embodied on a computer readable memory, and/or functions performed by logic implemented in hardware, in accordance with an example embodiment. The blocks in FIG. 13 may be considered to be interconnected means for performing the functions in the blocks. The blocks of FIG. 13 are assumed to be performed by a receipt eNB 170-R, e.g., under control of an adaptive management module 150 (which may also control the scheduler 101).

In block 1310, the eNB 170-R determines at a first cell that one or more user equipment in the first cell should have at least one hybrid automatic repeat request cycle skipped. Each of the one or more user equipment is to take part in an uplink coordinated multipoint transmission (i.e., the UE is a CoMP UE 110-1). Skipping of the at least one hybrid automatic repeat request cycle is to be performed to enable the first cell to receive information from one or more second cells (e.g., eNBs 170-H) over one or more backhaul links for the transmissions. In block 1320, the eNB 170-R schedules and participates in a first hybrid automatic repeat request cycle for the one or more user equipment in order to receive a transmission at the first cell from the one or more user equipment. For instance, the eNB 170-R receives information from the UE(s) in HARQ cycle 260-1.

In block 1330, the eNB 170-R skips, for hybrid automatic repeat request cycles subsequent to the first hybrid automatic repeat request cycle, the at least one hybrid automatic repeat request cycle for the one or more user equipment. For instance, the eNB 170-R may skip the HARQ cycle 260-2 for CoMP UE(s). The skipping is performed by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle. The skipping depends on at least one of a backhaul latency, a load in the first cell, a type of user equipment (e.g., CoMP users), or a request to the one or more second cells. That is, only one of the backhaul latency, a load in the first cell, a type of user equipment (e.g., CoMP users), or a request to the one or more second cells may be used, or multiple ones of these in any combination may be used.

The next examples are related to Example 1, Fixed HARQ Cycle Skip. In an example, the method 700 further comprises determining a number of hybrid automatic repeat request cycles to be skipped by the one or more first user equipment based on a backhaul latency, the number being at least one. Skipping further comprises skipping the number of the hybrid automatic repeat request cycles for the one or more user equipment by not scheduling the one or more user equipment for a physical downlink control channel grant for the number of hybrid automatic repeat request cycles. In another example, a method as in this paragraph includes where the one or more user equipment are one or more first user equipment and where the method further comprises the following. It is determined that one or more second user equipment in the first cell should have at least one hybrid automatic repeat request cycle skipped, where the one or more second user equipment are not to take part in uplink coordinated multipoint transmissions. The eNB schedules and participates in a second hybrid automatic repeat request cycle for the one or more second user equipment in order to receive a transmission at the first cell from the one or more second user equipment. The eNB skips, for hybrid automatic repeat request cycles subsequent to the second hybrid automatic repeat request cycle, the at least one hybrid automatic repeat request cycle for the one or more second user equipment by sending an acknowledgement to the one or more second user equipment and not scheduling the one or more second user equipment for a physical downlink control channel grant for the at least one hybrid automatic repeat request cycle for the second user equipment. The first hybrid automatic repeat request cycle and the second hybrid automatic repeat request cycle are performed on alternate hybrid automatic repeat request cycles. Additionally, the skipping for the first user equipment may occur in hybrid automatic repeat request cycles that are different from and alternate with the hybrid automatic repeat request cycles for the second user equipment.

The next examples relate to Example 2, Adaptive HARQ Cycle Skip. In an example the method 700 includes where the determining that the one or more user equipment in the first cell should have at least one hybrid automatic repeat request cycle skipped is performed based on load in the first cell (or load in the second cell), where the load is determined using a backhaul latency. This method may additionally be performed in response to the backhaul latency being a first value, where having two or more users per the first cell is considered to be a high load, while for the backhaul latency being a second value higher than the first value, three or more users per the first cell is considered to be a high load. In another example, determining and skipping are performed only in response to the load in the first cell being determined to be a high load. In a further example, the one or more user equipment are one or more first user equipment. The method further comprises scheduling hybrid automatic repeat request cycles for one or more second user equipment. The one or more second user equipment are not to take part in uplink coordinated multipoint transmissions. The method further comprises performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment.

The following examples relate to Example 3, On-demand HARQ Cycle Skip. The method 700 may further include where the skipping is performed only in response to a determination at the first cell a decoding of information from the transmission from the one or more user equipment has failed and the one or more user equipment are user equipment that have taken part in the uplink coordinated multipoint transmission. In another example 9, the skipping is performed also in response to a request being sent from the first cell to the one or more second cells requesting the one or more second cells send information from one or more second cells over the one or more backhaul links to the first cell for uplink coordinated multipoint transmissions by the one or more user equipment. The request is sent responsive to the failure of the decoding of information from the transmission from the one or more user equipment. Another example includes wherein the one or more user equipment are one or more first user equipment. The method further comprises scheduling hybrid automatic repeat request cycles for one or more second user equipment, wherein the one or more second user equipment are not to take part in uplink coordinated multipoint transmissions. The method further comprises performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment. In a further exemplary embodiment, a method includes wherein the determining that the one or more user equipment in the first cell should have at least one hybrid automatic repeat request cycle skipped is performed based on load in the first cell. Additionally, determining and skipping are performed only in response to the load in the first cell being determined to be a high load.

It is noted that the method 700 may be combined with any of the methods of FIGS. 3-6 described above. That is, many of the blocks in FIGS. 3-6 may be added to method 700. For example, blocks 330-340 may be added to method 700 in order for the eNB 170-R to decode information from CoMP users and to perform HARQ processing. Many other blocks may be similarly added to method 700.

In an exemplary embodiment, an apparatus comprises a means for performing the method shown in FIG. 13 and described above in reference to FIG. 13. Additionally, another example is an apparatus that includes one or more processors and one or more memories including computer program code. The one or more memories and the computer program code are configured to, with the one or more processors, cause the apparatus to perform the method of FIG. 13 and the other methods described above in reference to FIG. 13.

Without in any way limiting the scope, interpretation, or application of the claims appearing below, a technical effect of one or more of the example embodiments disclosed herein is to improve performance even with non-ideal backhaul latency. Another technical effect of one or more of the example embodiments disclosed herein is to allow a base station to receive information from other base stations for UL CoMP transmissions from UEs while mitigating delay in receiving that information over backhaul link(s). Another technical effect of one or more of the example embodiments disclosed herein is to retain IRC performance with low load conditions and retain ideal backhaul performance for higher loading conditions.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memories 125, 155, 171 or other device) that does not encompass propagating signals but may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined. Although various aspects are set out above and in the claims, other aspects comprise other combinations of features from the described embodiments and the claims, and not solely the combinations described above or in the claims. It is also noted herein that while the above describes example embodiments of the invention, these descriptions should not be viewed in a limiting sense. Rather, there are several variations and modifications which may be made without departing from the scope of the present invention as defined by the claims.

The following abbreviations that may be found in the specification and/or the drawing figures are defined as follows:

3GPP third Generation Partnership Project
ACK or Ack ACKnowledge
BS Base Station
CoMP Coordinated MultiPoint
DIC-CoMP Distributed Interference Cancellation-based CoMP
DL Downlink (from base station to UE)
eNB or eNodeB Enhanced Node B (LTE base station)
GHz Giga-Hertz
HARQ Hybrid Automatic Repeat request
id identification
IRC Interference Rejection Combining
JR Joint Reception
JR-CoMP Joint Reception-Coordinated MultiPoint
LTE Long Term Evolution
NCE Network Control Element
MAAS Multi-Aperture Antenna Selection
MME Mobility Management Entity
m meter
ms milliseconds
NACK or Nack Not acknowledge
NDI New Data Indicator
PF Proportional Fair
PUCCH Physical Uplink Control Channel
PUSCH Physical Uplink Shared Channel
RB Resource Block
Rel Release
SGW Serving GateWay
UE User Equipment
UL Uplink (from UE to base station)

What is claimed is:

1. A method, comprising:
   determining at a first cell that one or more user equipment in the first cell should have at least one hybrid automatic repeat request cycle skipped based at least on a load in the first cell, where the load in the first cell is determined using at least a backhaul latency and a number of user equipment per the first cell, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions;
   scheduling and participating in a first hybrid automatic repeat request cycle for the one or more user equipment in order to receive a transmission at the first cell from the one or more user equipment; and
   skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle,
   wherein the skipping depends on at least one of: a backhaul latency, a load in the first cell, a type of the user equipment, and a request to the one or more second cells.

2. The method of claim 1, wherein:
   the method further comprises determining a number of hybrid automatic repeat request cycles to be skipped by the one or more first user equipment based on a backhaul latency, the number being at least one; and skipping further comprises skipping the number of the hybrid automatic repeat request cycles for the one or more user equipment by not scheduling the one or more user equipment for a physical downlink control channel grant for the number of hybrid automatic repeat request cycles.

3. The method of claim 2, wherein the one or more user equipment are one or more first user equipment and wherein:
the method further comprises:
determining that one or more second user equipment in the first cell should have at least one hybrid automatic repeat request cycle skipped, where the one or more second user equipment are not to take part in uplink coordinated multipoint transmissions;
scheduling and participating in a second hybrid automatic repeat request cycle for the one or more second user equipment in order to receive a transmission at the first cell from the one or more second user equipment; and
skipping, for hybrid automatic repeat request cycles subsequent to the second hybrid automatic repeat request cycle, the at least one hybrid automatic repeat request cycle for the one or more second user equipment by sending an acknowledgment to the one or more second user equipment and not scheduling the one or more second user equipment for a physical downlink control channel grant for the at least one hybrid automatic repeat request cycle for the second user equipment,
the first hybrid automatic repeat request cycle and the second hybrid automatic repeat request cycle are performed on alternate hybrid automatic repeat request cycles, and
the skipping for the first user equipment occurs in hybrid automatic repeat request cycles that are different from and alternate with the hybrid automatic repeat request cycles for the second user equipment.

4. The method of claim 1, in response to the backhaul latency being a first value, having two or more users per the first cell is considered to be a high load, while for the backhaul latency being a second value higher than the first value, three or more users per the first cell is considered to be a high load.

5. The method of claim 1, wherein determining and skipping are performed only in response to the load in the first cell being determined to be a high load.

6. The method of claim 5, wherein the one or more user equipment are one or more first user equipment and wherein the method further comprises scheduling hybrid automatic repeat request cycles for one or more second user equipment, wherein the one or more second user equipment are not to take part in uplink coordinated multipoint transmissions, and the method further comprises performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment.

7. The method of claim 1, wherein the skipping is performed only in response to a determination at the first cell a decoding of information from the transmission from the one or more user equipment has failed and the one or more user equipment are user equipment that have taken part in the uplink coordinated multipoint transmission.

8. The method of claim 7, wherein the skipping is performed in response to a request being sent from the first cell to the one or more second cells requesting the one or more second cells send information from one or more second cells over the one or more backhaul links to the first cell for uplink coordinated multipoint transmissions by the one or more user equipment, wherein the request is sent responsive to the failure of the decoding of information from the transmission from the one or more user equipment.

9. The method of claim 7, wherein the one or more user equipment are one or more first user equipment and wherein the method further comprises scheduling hybrid automatic repeat request cycles for one or more second user equipment, wherein the one or more second user equipment are not to take part in uplink coordinated multipoint transmissions, and the method further comprises performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment.

10. The method of claim 7, wherein the determining that the one or more user equipment in the first cell should have at least one hybrid automatic repeat request cycle skipped is performed based on load in the first cell, wherein determining and skipping are performed only in response to the load in the first cell being determined to be a high load.

11. An apparatus, comprising:
one or more processors; and
one or more memories including computer program code,
the one or more memories and the computer program code configured, with the one or more processors, to cause the apparatus to perform the following:
determining at a first cell that one or more user equipment in the first cell should have at least one hybrid automatic repeat request cycle skipped based at least on a load in the first cell, where the load in the first cell is determined using at least a backhaul latency and a number of user equipment per the first cell, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions;
scheduling and participating in a first hybrid automatic repeat request cycle for the one or more user equipment in order to receive a transmission at the first cell from the one or more user equipment; and
skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle,
wherein the skipping depends on at least one of: a backhaul latency, a load in the first cell, a type of user equipment, and a request to the one or more second cells.

12. The apparatus of claim 11, wherein:
the one or more memories and the computer program code are further configured, with the one or more processors, to cause the apparatus to perform the following: determining a number of hybrid automatic repeat request cycles to be skipped by the one or more first user equipment based on a backhaul latency, the number being at least one; and skipping further comprises skipping the number of the hybrid automatic repeat request cycles for the one or more user equipment by not scheduling the one or more user equipment for a physical downlink control channel grant for the number of hybrid automatic repeat request cycles.

13. The apparatus of claim 12, wherein the one or more user equipment are one or more first user equipment and wherein:

the one or more memories and the computer program code are further configured, with the one or more processors, to cause the apparatus to perform the following:

determining that one or more second user equipment in the first cell should have at least one hybrid automatic repeat request cycle skipped, where the one or more second user equipment are not to take part in uplink coordinated multipoint transmissions;

scheduling and participating in a second hybrid automatic repeat request cycle for the one or more second user equipment in order to receive a transmission at the first cell from the one or more second user equipment; and skipping, for hybrid automatic repeat request cycles subsequent to the second hybrid automatic repeat request cycle, the at least one hybrid automatic repeat request cycle for the one or more second user equipment by sending an acknowledgement to the one or more second user equipment and not scheduling the one or more second user equipment for a physical downlink control channel grant for the at least one hybrid automatic repeat request cycle for the second user equipment, the first hybrid automatic repeat request cycle and the second hybrid automatic repeat request cycle are performed on alternate hybrid automatic repeat request cycles, and the skipping for the first user equipment occurs in hybrid automatic repeat request cycles that are different from and alternate with the hybrid automatic repeat request cycles for the second user equipment.

14. The apparatus of claim 11, wherein determining and skipping are performed only in response to the load in the first cell being determined to be a high load.

15. The apparatus of claim 14, wherein the one or more user equipment are one or more first user equipment and wherein the one or more memories and the computer program code are further configured, with the one or more processors, to cause the apparatus to perform the following: scheduling hybrid automatic repeat request cycles for one or more second user equipment, wherein the one or more second user equipment are not to take part in uplink coordinated multipoint transmissions, and performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment.

16. The apparatus of claim 11, wherein the skipping is performed only in response to a determination at the first cell a decoding of information from the transmission from the one or more user equipment has failed and the one or more user equipment are user equipment that have taken part in the uplink coordinated multipoint transmission.

17. The apparatus of claim 16, wherein the skipping is performed also in response to a request being sent from the first cell to the one or more second cells requesting the one or more second cells send information from one or more second cells over the one or more backhaul links to the first cell for uplink coordinated multipoint transmissions by the one or more user equipment, wherein the request is sent responsive to the failure of the decoding of information from the transmission from the one or more user equipment.

18. The apparatus of claim 16, wherein the one or more user equipment are one or more first user equipment and wherein the one or more memories and the computer program code are further configured, with the one or more processors, to cause the apparatus to perform the following: scheduling hybrid automatic repeat request cycles for one or more second user equipment, wherein the one or more second user equipment are not to take part in uplink coordinated multipoint transmissions, and performing the scheduled hybrid automatic repeat request cycles for the one or more second user equipment, wherein the scheduled hybrid automatic repeat request cycles overlap the first hybrid automatic repeat request cycle and the skipped at least one hybrid automatic repeat request cycle for the one or more user equipment.

19. A computer program product comprising a non-transitory computer-readable storage medium bearing computer program code embodied therein for use with a computer, the computer program code, responsive to execution by the computer, causes the computer to perform at least:

determining at a first cell that one or more user equipment in the first cell should have at least one hybrid automatic repeat request cycle skipped based at least on a load in the first cell, where the load in the first cell is determined using at least a backhaul latency and a number of user equipment per the first cell, where each of the one or more user equipment is to take part in an uplink coordinated multipoint transmission, and where skipping of the at least one hybrid automatic repeat request cycle is to be performed to enable the first cell to receive information from one or more second cells over one or more backhaul links for the hybrid automatic repeat request transmissions;

scheduling and participating in a first hybrid automatic repeat request cycle for the one or more user equipment in order to receive a transmission at the first cell from the one or more user equipment; and skipping, for hybrid automatic repeat request cycles subsequent to the first hybrid automatic repeat request cycle, the at least one hybrid automatic repeat request cycle for the one or more user equipment by sending, prior to decoding information from the uplink coordinated multipoint transmissions, an acknowledgement to the one or more user equipment and not scheduling the one or more user equipment for a physical downlink control channel grant for the at least one hybrid automatic repeat request cycle, wherein the skipping depends on at least one of: a backhaul latency, a load in the first cell, a type of the user equipment, and a request to the one or more second cells.

* * * * *